United States Patent [19]

Maury et al.

[11] Patent Number: 4,750,436
[45] Date of Patent: Jun. 14, 1988

[54] METHOD AND PLANT FOR THE TREATMENT OF CONTAMINATED SOILS AND SIMILAR MATERIAL

[75] Inventors: Hans-Dietmar Maury, Ahlen; Wolfgang Buslowski, Ennigerloh; Bernold Kraft, Ahlen, all of Fed. Rep. of Germany

[73] Assignee: O&K Orenstein & Kopel, DEX

[21] Appl. No.: 72,126

[22] Filed: Jul. 10, 1987

[30] Foreign Application Priority Data

Jul. 16, 1986 [DE] Fed. Rep. of Germany ....... 3623939

[51] Int. Cl.⁴ .............................................. F23G 5/00
[52] U.S. Cl. .................................... 110/346; 110/232; 110/236; 110/347; 241/DIG. 10
[58] Field of Search ............... 110/236, 232, 347, 346; 241/DIG. 10

[56] References Cited

U.S. PATENT DOCUMENTS 3,250,016  5/1966  Agarwal ........................ 110/232 X
4,648,333  3/1987  Mudd et al. ................... 110/236 X
4,667,609  5/1987  Hardison et al. .................. 110/236

Primary Examiner—Edward G. Favors
Attorney, Agent, or Firm—Martin A. Faber

[57] ABSTRACT

In order to create a technically more effective and more economical method of decontamination by which complete decomposition of all injurious substances is obtained in simple fashion, it is proposed, in connection with a method and a plant for the treatment of contaminated soils, that the drying can be combined in a mill passed through by hot gases with a crushing of the material to a particle size of 0 to 10 mm, that after the drying the material, together with the gaseous phase, be treated in the form of a solid/gas dispersion in a heating and decontamination path with burner, with a temperature within the range of 800° C. to 1200° C. and then be separated in a cyclone separator stage from the gaseous phase which contains all injurious substances, said phase being recycled with the burner for the complete decomposition of the injurious substances, a partial stream of the combustion gases being fed to the combined drying and comminuting stage and the purified solids being removed after a cooling the cooling air of which is fed to the burner as preheated primary air.

11 Claims, 1 Drawing Sheet

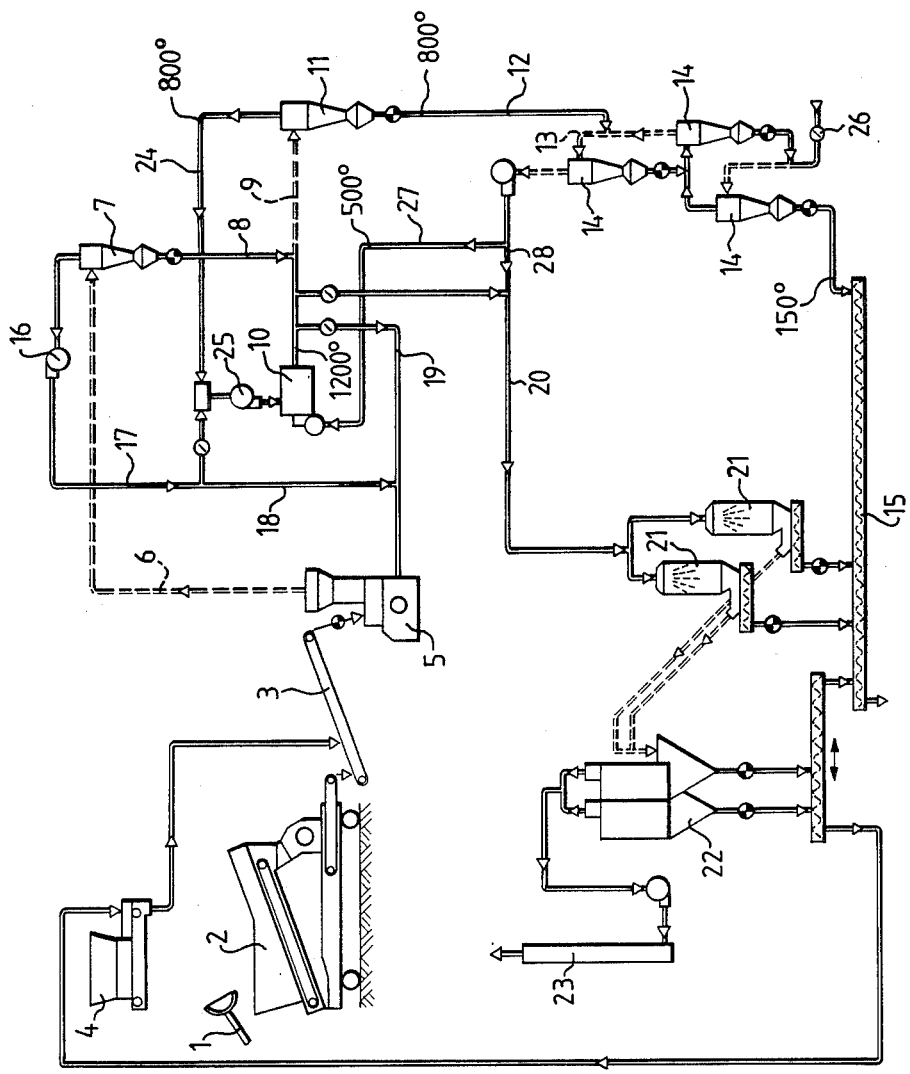

METHOD AND PLANT FOR THE TREATMENT OF CONTAMINATED SOILS AND SIMILAR MATERIAL

FIELD AND BACKGROUND OF THE INVENTION

The invention relates to a method and plant for the treatment of contaminated soils and similar material in general, and in particular of coke-oven locations, by removal, decontamination and refilling of the place of removal with purified earth, in which the material removed is dried, possibly after a preliminary treatment, and then treated thermally with a high temperature.

For the elimination of deposits in rivers it is known to dredge them and feed the material to a rotating tubular kiln plant after effecting a preliminary treatment which consists of comminution in a crusher and screening. The rotating tubular kiln plant consists of two rotating cylindrical drums arranged one behind the other, the first of which operates as drying drum for the pre-drying of the material. The second rotating tubular kiln as seen in the direction of flow of the material is fired with an open flame which acts directly on the solids to be cleaned at temperatures between 400° C. and 800° C. Purified earth is removed from the rotating tubular kiln and returned to the place from which it has been removed.

The waste gases formed in the rotating tubular kiln plant, after removal of the dust contained therein, are heated in a combustion chamber with separate burner to a temperature of about 1200° C. and thus decontaminated. After cooling and filtering, the purified waste gases are discharged into the atmosphere. A part of the waste gases are fed to the rotating cylindrical drying drum in order to intensify the drying process and improve the energy balance.

The known method has the disadvantage that the preliminary treatment by crushing and screening is not sufficient to assure uniformly small particle sizes of the contaminated material so that the following drying method step is also ineffective. "Complete cooking" of the material is not assured.

In the following method step consisting of the direct action of a flame on the solid material in the rotating tubular kiln, there is the disadvantage that there is not a uniform action of temperature but rather there are formations of strands of cold gas which lead to untreated strands of solids in the material removed, which is thus only inadequately cleaned. In principle, there is the problem upon using rotating tubular kilns for the drying and thermal treatment that considerable leaks occur at the individual rotating kilns between the stationary and rotating parts so that either the entrance of air resulting in an impairment of the energy balance must be feared or break-outs of air occur which result in the giving off of contamination-loaded gases to the environment. Any discharge of injurious substances into the surroundings must, however, be avoided. Finally, the temperatures obtained in a rotating tubular kiln are not sufficient to decompose all injurious substances, so that the earth cleaned in this way no longer satisfies modern requirements as to the protection of the environment. Finally the return of cleaned hot off-air to the drying drum which is effected in a partial stream behind the second burner is inadequate from an energy standpoint.

SUMMARY OF THE INVENTION

It is an object of the invention to provide a technically more effective and more economical method of decontamination by which the above-indicated disadvantages are eliminated and complete decomposition of all injurious substances is achieved in a simple manner. In order to carry out this method, a plant is to be developed which operates without rotary tubular kilns and is simplified with regard to its apparatus.

According to the invention, drying in a mill (5) which is passed through by hot gases is combined with a comminuting of the material to a particle size of 0 to 10 mm in such a manner that a substantial part of the injurious substances is transferred into the gaseous phase; after the drying the material is treated, together with the gaseous phase in the form of a solid/gas dispersion in a heating and decontamination path (9) provided with burner, with a temperature within the range of 800° to 1200° C. and then separated in a cyclone separator stage (11) from the gaseous phase which contains all the injurious substances, that phase being recycled with the burner (10) for the complete decomposition of the injurious substances, a partial stream of the combination gases being fed to the combined drying and comminuting stage (mill 5); and the purified solids are removed after cooling, the cooling air thereof being fed to the burner (10) as preheated primary air.

By crushing of the solid to particle sizes of less than 10 mm the result is obtained that the total solids are already heated throughout in the drying stage at temperatures between 500° C. and 800° C. and that thus a substantial part of the injurious substances are removed by evaporation. In the following heating and decontamination path which is provided with burner the solid/gas dispersion is treated with a temperature within the range of 800° C. to 1200° C. so that all higher hydrocarbons are also vaporized out and decomposed. The separating of the dispersion into its solid phase, on the one hand, and its gaseous phase, on the other hand, takes place in the following cyclone separator stage behind which the gaseous phase is recycled with the burner while the purified solid is removed after a cooling the cooling air of which is fed to the burner as preheated primary air. The combustion gases of the burner are fed in a partial stream both to the drying stage and to the decontamination path.

Advantageously according to a feature of the invention, between the drying stage (mill 5) and the decontamination path (9) there is another cyclone separator stage (7) in order to separate there gas which has already been contaminated from the solids, whereupon one part of the gas which has been separated is added to the combustion gases which are fed to the drying stage and the other part is added directly the burner (10), while the solids which have been removed are treated thermally in the decontamination path (9). In particular, it is thereby made possible to develop the drying stage in simpler fashion from the standpoint of its apparatus since lower temperatures occur.

An improvement in the treatment in the drying stage (mill 5) is furthermore obtained by a suitable feature of the invention in which the material placed therein is crushed to a particle size of 0 to 3 mm.

According to a further feature of the invention, the final cooling of the solids is effected to about 150° C.

Still further according to the invention, excess combustion gases are given off to the atmosphere after passing through a cooling process and a filtering process.

The invention also provides an apparatus for the carrying out of the method of treating contaminated soils and similar material by removal, decontamination and refilling, proceeding from a preliminary treatment, in particular a crusher with screening plant, a drying apparatus and an apparatus for the thermal treatment of the material, a cyclone separator for the separating of the solids from the gaseous phase and a burner to which the gaseous phase can be fed, characterized by a mill (5) which is heated by the combustion gas of the burner (10) and serves as combined drying and comminuting stage, by a heating and decontamination path (9), also heated by the combustion gas of the burner, the path being in the form of a tube separated from the burner flame with solid/gas dispersion as apparatus for the thermal treatment, by a multi-stage cooling device (13, 14) for the cleaned solid material with a device (27) for feeding the cooling air preheated in the cooling device to the burner (10), by a recycle plant (24, 25) between the gas outlet of the cyclone separator (11), the burner (10) and the decontamination path (9), and by an outlet (20) for excess combustion gas having a cooling and dust-removing device (21, 22).

The entire apparatus is of comparatively simple construction; it has no sealing problems, has only a single burner the combustion gases of which are used for the drying and decontamination so that the additional burner for the heating of the material which has been used up to now in the prior art is dispensed with and control of temperature is made possible in all parts of the plant by recycle streams. Furthermore there is the advantage that no solids come into contact with the burner flame (about 2000° C.) so that there is no formation of a molten phase which would lead to the volatility of the heavy metals incorporated crystallographically in source soils and could thus give rise to undesired emissions of heavy metals or accumulations in the filter dust or clean-gas dust. The temperature of removal of the decontaminated solids after the cooling is only about 150° C. and thus permits direct transportation for the refilling of the place of removal with purified earth. By the excellent, homogeneous heating of the solids in a solid/gas dispersion, no over-burning of the solids takes place so that the material removed, while biologically dead, is not mineralogically dead and is thus reactivatable.

A suitable feature of the invention is that another cyclone separator (7) is inserted behind the mill (5) and in front of the decontamination path (9), the gas outlet of this cyclone separator (7) extending via a tube connecting plant (16–18) provided with blower to the burner (10) and the mill (5) in two partial streams.

The cooling device for the purified solids advantageously comprises three cooling stages each having a cooling path (13) followed by a cyclone separator stage (14). A conveyor worm (15) can be provided for the removal of the solids.

Still further according to the invention, the cooling and dust-removal device (21, 22) for excess combustion gas comprises a plurality of evaporation coolers followed by filters.

BRIEF DESCRIPTION OF THE DRAWING

With the above and other objects and advantages in view, the present invention will become more clearly understood in connection with the detailed description of a preferred embodiment, when considered with the accompanying drawing, of which:

The sole FIGURE is a flow sheet of a plant according to the invention for the treatment of contaminated soils.

DETAILED DESCRIPTION OF THE PREFERRED EMBODIMENT

The soils to be decontaminated are fed by means of a loader 1 to a mobile crusher 2 for the coarse comminution of, for instance, old foundations, boulders and tree stumps or construction material, and then charged via a conveyor belt 3 into the plant. As an alternative, the charging can also be effected via a charging bunker 4 with vibrating screen. Adjoining the conveyor belt 3 is a mill 5 passed through by hot gases, the mill being connected via a pipeline 6 to a cyclone separator 7. From the latter, the solids pass via a pipeline 8 into a heating and decontamination path 9 in the form of a reinforced pipe.

The heating and decontamination path is connected to a burner 10 which is so arranged with respect to said path that the substances to be treated do not come into contact with the flame of the burner. The burner 10 can be operated with any desired fuel, particularly extra-light heating oil, but also waste oil.

Adjoining the heating and decontamination path 9 there is a heavy-duty cyclone separator 11 in which the purified solids are separated from the gaseous phase. The solids, that is the decontaminated earth, flow over a drop line 12 from the cyclone separator 11 to a three-stage cooling. Each of the three cooling stages consists of a cooling path 13 and a cyclone separator stage 14 behind it. The stream of solids leaves the cooling system over a conveyor worm 15 with a temperature of about 150° C.

A first contaminated gaseous phase is present at the cyclone separator 7. By means of a blower 16, which also assumes the transport of the solid/gas dispersion out of the mill 5, the gaseous phase of the cyclone separator 7 is fed via a pipeline 17 in a partial stream to the burner 10 and heated there to 1200° C., whereby the complete decomposition of all injurious substances is obtained. The other partial stream is fed via a pipeline 18 to the hot gas feed to the mill 5 for the temperature control. The stream of hot gas to the mill consists of the combustion gases of the burner 10, which are brought in part via a pipeline 19 to the mill, the other part discharging into the decontamination path 9. An excess partial stream of the combustion gases is fed via a pipeline 20 to a cooling device 21 consisting, in particular, of a plurality of evaporation coolers and to a subsequent dust removal in filters 22 and given off from there in purified form to the atmosphere via the chimney 23.

Within the cyclone separator 11, the solids are separated from a gaseous phase, also contaminated, from the thermal treatment in the heating and decontamination path 9. This gaseous phase is conducted via a pipeline 24 in continuous cycle by means of a blower 25 to the burner 10 and then via the heating and decontamination path 9 back to the cyclone 11.

At the air feed 26, the necessary cooling air for the multi-stage cooling device 13/14 is drawn in from the atmosphere and fed for recovery of energy after passing through the cooling device hot with a temperature of about 500° C. to the burner 10 as primary air via a pipeline 27. An outlet 28 to the cooling device 21 can be provided for excess primary air.

The operation of the plant is as follows:

The contaminated soils are simultaneously dried by a stream of hot gas of about 500° C. and crushed to a particle size of 0 to 3 mm in the mill 5. By the comminuting of the solids to particle sizes of less than 3 mm with the simultaneous action of temperature, a thorough heating of the solids is assured and thus a considerable part of the injurious substances are already transferred into the gaseous phase. The comminuted material is removed as a solids/gas dispersion from the mill 5 and fed under the action of the fan 6 to the cyclone separator 7. The gas separated there in part passes into the burner and in part goes back to the hot gas for the mill 5. The solids which are completely dried there are transferred to the heating and decontamination path 9 and treated thermally there with a temperature of about 800° C. to 1200° C., this temperature being sufficient to evaporate even the higher hydrocarbon compounds. The removal of the purified solids is effected in the heavy-duty cyclone separator stage 11 and is removed from there, after cooling, out of the plant with a temperature of about 150° C. by the conveyor worm 15.

By the discharge of the excess partial stream of gas via the pipeline 20, the cooling 21 and the dust removal 22, solid material is obtained there also. If contaminated soils which do not contain any accumulation of heavy metal but have only the heavy metal present in the source rock are treated in the plant described, then the plant is operated in such a manner by homogeneous heating of the solids in the gas phase that there is no formation of a molten phase which would lead to volatility of the heavy metals incorporated crystallographically in the source rock and could thus lead to heavy-metal emissions or accumulations. The solids then removed from the filters 22 can be used for the refilling of the place of removal. If, on the other hand, soils are treated which are contaminated by accumulation of heavy metals then the material removed from the filters 22 must be fed to a special dump. In this way, however, there is the overall assurance that by far the greatest part of the contaminated soils to be treated, even with due consideration of the maximum contamination of useful land and the regulations concerning the content of heavy metals, can be refilled and in any event very small quantities need be to a dump. By the method described and with the apparatus proposed for the carrying out thereof, it is possible in a simple and economical manner to convert contaminated material completely or almost completely back into a purified reusable form.

We claim:

1. A method for treatment of contaminated soils and similar material, particularly in coke-oven locations, by removal and decontamination of the material, and refilling of the place of removal with purified earth, in which method the material removed is dried and then treated thermally at a high temperature, comprising the steps of drying the material in a mill and passing hot gases through the mill;

comminuting the material in the mill to a particle size of 0 to 10 mm and allowing a substantial part of injurious substances of the material to be transferred into the gaseous phase;

after the drying, treating the material together with the gaseous phase in the form of a solid/gas dispersion in a heating and decontamination conduit provided with a burner, the treating being done at a temperature within the range of 800° to 1200° C.;

in a cyclone separator stage, separating the material from the gaseous phase which contains injurious substances;

recycling the gaseous phase via the burner for a complete decomposition of the injurious substance;

feeding a partial stream of the combustion gases back to the mill;

cooling purified solids of the material via cooling air, and thereafter removing the solids; and applying the cooling air to the burner as preheated primary air.

2. The method according to claim 1 wherein between the mill and the decontamination path there is a further cyclone separator stage, the method comprising further steps of adding one part of gas from the further separator stage to the combustion gases for feeding to the mill, and adding the remainder of the gas from the further separator stage directly to the burner; and concurrently thermally treating the solids which have been removed from the material in the decontamination conduit.

3. The method according to claim 2, further comprising a step, via use of said further cyclone separator stage, of separating contaminated gas from the solids.

4. The method according to claim 1 further comprising a step, employing the mill, of crushing the material to a particle size of 0 to 3 mm.

5. The method according to claim 1, wherein said cooling of the solids is effected at a temperature of about 150° C.

6. The method according to claim 1, wherein said cooling is followed by steps of filtering combustion gases and discharging excess combustion gases to the atmosphere.

7. A system for implementing a process of treating contaminated soils and similar material by removal, decontamination and refilling by employing drying apparatus and an apparatus for the thermal treatment of the material, in combination with a cyclone separator for separating solids from a gaseous phase and a burner to which the gaseous phase is fed, wherein the system comprises a mill which is heated by the combustion gas of the burner and serves as combined drying and comminuting stage, there being a heating and decontamination conduit connecting with the burner; and wherein the mill is heated by the combustion gas of the burner, the conduit including a tube separated from the burner flame for carrying solid/gas dispersion to provide the thermal treatment; the system further comprising a multi-stage cooling device for cooling cleaned solid material;

a device for feeding the cooling air from a preheating in the cooling device to the burner;

a recycle plant connected between a gas outlet of the cyclone separator and the burner and the decontamination conduit; and a cooling and dust-removing device, there being an outlet of the cooling and dust-removing device for excess combustion gas.

8. The system according to claim 7, comprising a further cyclone separator inserted behind the mill and before the decontamination conduit, a gas outlet of the further cyclone separator extending via the tube connecting plant to the burner and the mill in two partial streams.

9. The system according to claim 7, wherein the cooling device for the purified solids comprises three cooling stages each having a cooling path followed by a cyclone separator stage.

10. The system according to claim 7, further comprising
a conveyor worm connected to the cooling device for removal of the solids.

11. The system according to claim 7, wherein the cooling and dust-removal device for excess combustion gas comprises a plurality of evaporation coolers followed by filters.

* * * * *